United States Patent
Zhang et al.

(10) Patent No.: US 10,430,344 B2
(45) Date of Patent: Oct. 1, 2019

(54) MEMORY RESOURCE MANAGEMENT METHOD AND APPARATUS

(71) Applicant: Huawei Technologies Co., Ltd., Shenzhen, Guangdong (CN)

(72) Inventors: Xianfu Zhang, Shenzhen (CN); Qiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/392,317

(22) Filed: Dec. 28, 2016

(65) Prior Publication Data

US 2017/0185522 A1 Jun. 29, 2017

(30) Foreign Application Priority Data

Dec. 28, 2015 (CN) .......................... 2015 1 1005125

(51) Int. Cl.
*G06F 12/00* (2006.01)
*G06F 12/0891* (2016.01)
(Continued)

(52) U.S. Cl.
CPC .......... *G06F 12/0891* (2013.01); *G06F 12/08* (2013.01); *G06F 12/0815* (2013.01);
(Continued)

(58) Field of Classification Search
CPC .. G06F 12/0891; G06F 12/08; G06F 12/0815; G06F 12/121; G06F 2212/60;
(Continued)

(56) References Cited

U.S. PATENT DOCUMENTS

| | | | |
|---|---|---|---|
| 6,173,368 B1 * | 1/2001 | Krueger | G06F 12/0888 711/133 |
| 2002/0019716 A1 * | 2/2002 | Agesen | G06F 11/3447 702/83 |

(Continued)

FOREIGN PATENT DOCUMENTS

| | | |
|---|---|---|
| CN | 101197786 A | 6/2008 |
| CN | 103064762 A | 4/2013 |
| EP | 0706135 A1 | 4/1996 |

*Primary Examiner* — Kalpit Parikh
(74) *Attorney, Agent, or Firm* — Kilpatrick Townsend & Stockton, LLP

(57) ABSTRACT

The present invention provides a memory resource management method and apparatus. The method includes: first, determining a recyclable cache unit according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied; and then, recycling the recyclable cache unit. A quantity of cache unit recycling periods is set, and when a time for which a cache unit has been occupied reaches the preset quantity of cache unit recycling periods, the cache unit is forcibly recycled, thereby effectively improving cache unit utilization and improving system bandwidth utilization.

10 Claims, 5 Drawing Sheets

(51) Int. Cl.
   *G06F 12/08* (2016.01)
   *G06F 12/0815* (2016.01)
   *G06F 12/121* (2016.01)
   *G06F 11/10* (2006.01)

(52) U.S. Cl.
   CPC ........ *G06F 11/1064* (2013.01); *G06F 12/121* (2013.01); *G06F 2212/1016* (2013.01); *G06F 2212/60* (2013.01); *G06F 2212/621* (2013.01)

(58) Field of Classification Search
   CPC ....... G06F 2212/621; G06F 2212/1016; G06F 11/1064
   See application file for complete search history.

(56) References Cited

U.S. PATENT DOCUMENTS

2007/0233964 A1* 10/2007 Robinson ............ G06F 12/0864
   711/136
2008/0162795 A1 7/2008 Hsieh et al.
2008/0243968 A1* 10/2008 Schmelter ........... G06F 12/0253

* cited by examiner

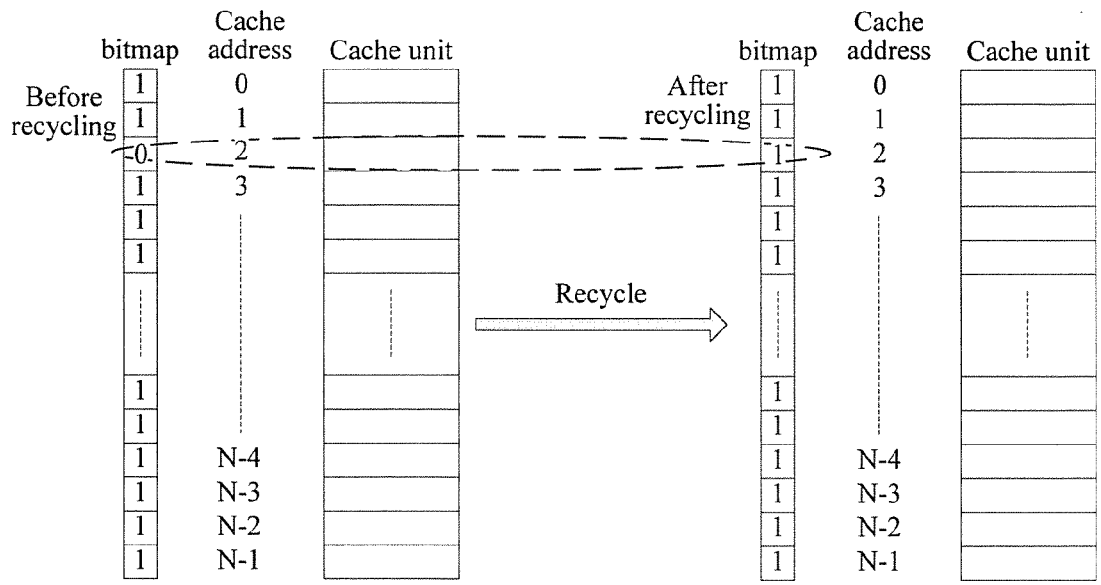

FIG. 3

Determine a recyclable cache unit according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied — 101

Recycle the recyclable cache unit — 102

FIG. 4

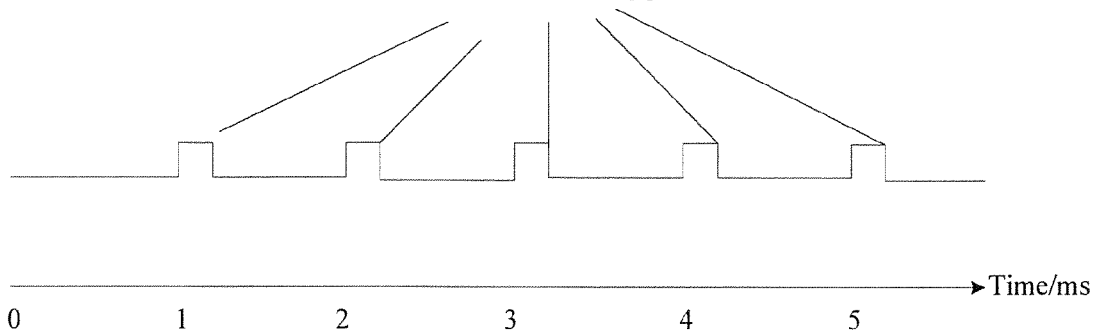

FIG. 5

MEMORY RESOURCE MANAGEMENT METHOD AND APPARATUS

CROSS-REFERENCE TO RELATED APPLICATION

This application claims priority to Chinese Patent Application No. 201511005125.4, filed on Dec. 28, 2015, which is hereby incorporated by reference in its entirety.

TECHNICAL FIELD

The present invention relates to computer technologies, and in particular, to a memory resource management method and apparatus.

BACKGROUND

With an increasing scale of data processing chips, there are more on-chip memories. To reduce a scale of memories, shared caches are used in some cases in which whole-thread caches are not needed, so as to reduce memory resources. Therefore, resource management of shared caches is particularly important.

FIG. 1 is a block diagram of basic implementation of a shared cache. As shown in FIG. 1, after a command (such as read, write, add, subtract, search, or flow control) from an ATOM (a programmable processor) enters an input processing module, the input processing module parses the command to confirm whether the command needs cache data. If the command needs cache data, the input processing module sends a cache application to a cache management module. The cache management module searches a bitmap table, and if the bitmap table indicates that there is an idle cache unit (that is, there is a cache unit labeled as 1 in the bitmap table), the cache management module allocates an idle cache unit and feeds back a cache address of the cache unit to the input processing module. In this step, an indication in the bitmap table that corresponds to the allocated cache unit further needs to be labeled as that the cache unit is occupied (that is, the indication in the bitmap table that corresponds to the cache unit is labeled as 0), as shown in FIG. 2. The input processing module stores, according to the returned cache address, associated information that does not participate in data processing, such as a thread identity (IDentity, ID for short) of the command, in a shared cache, and sends the cache address and the command together to a command processing module for data processing. In the whole processing process, the associated information of the command is stored in the shared cache throughout. After command processing ends, the command processing module sends a processing result and the cache address to an output processing module. The output processing module reads out the associated information in the shared cache according to the cache address and sends the cache address to the cache management module for cache recycling, and then the indication in the bitmap table that corresponds to the cache address is labeled as that the cache unit is not occupied (that is, the indication in the bitmap table that corresponds to the cache unit is labeled as 1), as shown in FIG. 1. Finally, the output processing module sends the command processing result and cache data together.

Further, a data processing module further includes a first in first out (First Input First Output, FIFO for short) queue, a crossbar (Crossbar), a scheduler (Scheduler) and the like. Therefore, if an error checking and correcting (Error Correcting Code, ECC for short) error or a parity error occurs in data in a whole path of the data processing module, a cache address and a whole command are untrusted. Consequently, the command is lost. As a result, no corresponding cache address is sent to the output processing module, and then the cache management module cannot receive a cache address sent from the output processing module. Consequently, a cache unit corresponding to the cache address is always being occupied, which causes a cache unit leakage (until a system is reset or the bitmap is initialized).

Therefore, as a runtime of the system becomes longer, available cache space inevitably becomes smaller due to the cache unit leakage, which then lowers a bandwidth and performance of the system.

SUMMARY

Embodiments of the present invention provide a memory resource management method and apparatus to overcome the problem in the prior art that a bandwidth and performance of a system is lowered because resources become fewer due to resource leakage.

According to a first aspect, an embodiment of the present invention provides a memory resource management method, including: determining a recyclable cache unit according to first indication info nation and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied; and recycling the recyclable cache unit.

In this embodiment, a quantity of cache unit recycling periods is set, and when a time for which a cache unit has been occupied reaches the preset quantity of cache unit recycling periods, the cache unit is forcibly recycled, thereby effectively improving cache unit utilization and improving system bandwidth utilization.

In some embodiments of the foregoing first aspect, the determining a recyclable cache unit according to first indication information and second indication information that correspond to each cache unit includes: determining whether the first indication information corresponding to the cache unit indicates that the cache unit is occupied, and if the first indication information indicates that the cache unit is occupied, determining, according to the second indication information corresponding to the cache unit, whether the cache unit has been occupied for n cache unit recycling periods, where n is a positive integer greater than or equal to 1, and if yes, determining that the cache unit is a recyclable cache unit.

In this embodiment, whether the cache unit is occupied is determined, and a quantity of cache unit recycling periods for which the cache unit has been occupied is also determined. When a preset quantity of cache unit recycling periods is reached, even if the cache unit is occupied, the cache unit is forcibly recycled, thereby effectively improving cache unit utilization and improving system bandwidth utilization.

Further, in some embodiments of the foregoing first aspect, the method further includes: if the cache unit has been occupied for m cache unit recycling periods, where m is a positive integer less than or equal to n, changing the second indication information corresponding to the cache unit into that the cache unit has been occupied for m+f cache unit recycling periods, where f is a positive integer greater than or equal to 1, and m+f is a positive integer less than or equal to n.

In this embodiment, a quantity of cache unit recycling periods for which the cache unit has been occupied can be changed, so that when the quantity of cache unit recycling periods for which the cache unit has been occupied reaches a preset quantity of cache unit recycling periods, the cache unit is forcibly recycled, thereby effectively improving cache unit utilization and improving system bandwidth utilization.

Optionally, in some embodiments of the foregoing first aspect, after the recycling the recyclable cache unit, the method further includes: changing the first indication information corresponding to the recyclable cache unit into that the recyclable cache unit is not occupied, and changing the second indication information corresponding to the recyclable cache unit into that the recyclable cache unit has been occupied for 0 cache unit recycling periods.

Optionally, in some embodiments of the foregoing first aspect, before determining a recyclable cache unit according to first indication information and second indication information that correspond to each cache unit, the method further includes: receiving a cache unit recycling instruction, where the cache unit recycling instruction carries an address corresponding to a to-be-recycled cache unit; and recycling the to-be-recycled cache unit according to the address.

In this embodiment, the method of the present invention can be flexibly used, that is, after the cache unit recycling instruction is received, a cache unit corresponding to the cache unit recycling instruction can be recycled, thereby improving cache unit utilization.

Further, in some embodiments of the foregoing first aspect, before the cache unit recycling instruction is received, the method further includes:

labeling the first indication information corresponding to each cache unit as that the cache unit is not occupied, and labeling the second indication information corresponding to each cache unit as that the cache unit has been occupied for 0 cache unit recycling periods.

A second aspect of the present invention provides a memory resource management apparatus, including:

a processing module, configured to determine a recyclable cache unit according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied; and a recycling module, configured to recycle the recyclable cache unit.

Further, the processing module is specifically configured to:

determine whether the first indication information corresponding to the cache unit indicates that the cache unit is occupied, and if the first indication information indicates that the cache unit is occupied, determine, according to the second indication information corresponding to the cache unit, whether the cache unit has been occupied for n cache unit recycling periods, where n is a positive integer greater than or equal to 1, and if yes, determine that the cache unit is a recyclable cache unit.

Further, the processing module is further configured to determine whether the cache unit has been occupied for m cache unit recycling periods, where m is a positive integer less than or equal to n, and if yes, the processing module is configured to change the second indication information corresponding to the cache unit into that the cache unit has been occupied for m+f cache unit recycling periods, where f is a positive integer greater than or equal to 1, and m+f is a positive integer less than or equal to n.

Further, the processing module is further configured to change, after the recycling module recycles the recyclable cache unit, the first indication information corresponding to the recyclable cache unit into that the recyclable cache unit is not occupied, and the second indication information corresponding to the recyclable cache unit into that the recyclable cache unit has been occupied for 0 cache unit recycling periods.

Further, the apparatus further includes: a receiving module, where the receiving module is configured to receive, before the processing module determines the recyclable cache unit according to the first indication information and the second indication information that correspond to each cache unit, a cache unit recycling instruction, where the cache unit recycling instruction carries an address corresponding to a to-be-recycled cache unit; and the processing module is further configured to: recycle the to-be-recycled cache unit according to the address.

Further, the processing module is further configured to label, before the receiving module receives the cache unit recycling instruction, the first indication information corresponding to each cache unit as that the cache unit is not occupied, and the second indication information corresponding to each cache unit as that the cache unit has been occupied for 0 cache unit recycling periods.

The embodiments of the present invention provide a memory resource management method and apparatus. The method includes: first, determining a recyclable cache unit according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied; and then, recycling the recyclable cache unit. A quantity of cache unit recycling periods is set, and when a time for which a cache unit has been occupied reaches the preset quantity of cache unit recycling periods, the cache unit is forcibly recycled, thereby effectively improving cache unit utilization and improving system bandwidth utilization.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 3 is a second diagram of a status change of memory resource management;

FIG. 4 is a flowchart of a memory resource management method according to the present invention;

FIG. 5 is a schematic diagram of a cache unit recycling period;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
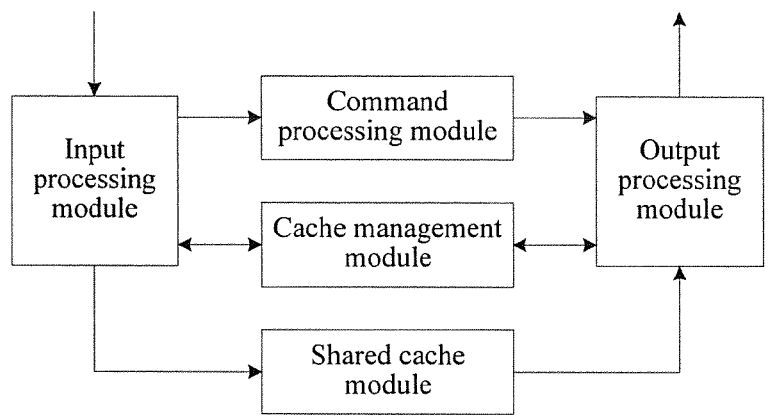
FIG. 1 is a block diagram of basic implementation of a shared cache.
Figure 2:
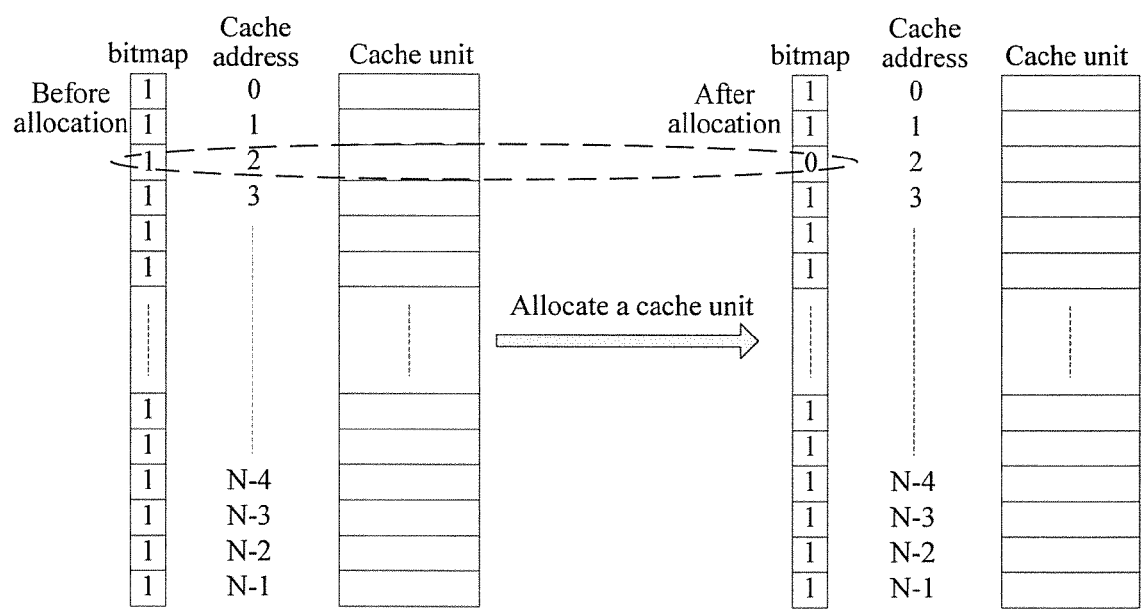
FIG. 2 is a first diagram of a status change of memory resource management.

In the prior art, an apparatus for managing shared caches is a bitmap table. As shown in FIG. 1, FIG. 2 and FIG. 3, 1 bit in a bitmap table is used to indicate whether a cache unit of a shared cache is occupied, and a position of the 1 bit in the bitmap table is an address of the corresponding cache unit in the shared cache. When a command needs to be processed, an input processing module applies to a cache management module for a cache unit, the cache management module searches the bitmap table, and if there is an indication indicating that there is an idle cache unit in the bitmap table, the idle cache unit is allocated. For example, if a cache unit whose cache address is 2 is allocated, the 1 bit in the bitmap table that corresponds to the cache unit whose cache address is 2 is labeled as that the cache unit is occupied, that is, the 1 bit in the bitmap table is changed from 1 to 0. Data related to the command is written in the allocated cache unit, and the address of the cache unit and information that the command is to be processed are sent to a next-level module. After the command is processed and the stored data is read out from the cache unit, the cache management module recycles the cache unit. On the basis of the foregoing example, data stored in the cache unit corresponding to the cache address being 2 is read out, and then the cache unit corresponding to the cache address being 2 is recycled, and the 1 bit in the bitmap table that corresponds to the cache unit whose cache address is 2 is labeled as that the cache unit is not occupied, that is, the 1 bit in the bitmap table is changed from 0 to 1.

For some reasons, the command cannot be processed. Consequently, the cache management module cannot receive the cache address to be recycled, and the cache unit corresponding to the cache address is always being occupied (until a system is reset or the bitmap is initialized).

Therefore, as a runtime of the system becomes longer, available storage space inevitably becomes smaller due to resource leakage, lowering a bandwidth and performance of the system.

To resolve the foregoing problem, it is found that a cache unit recycling period may be set. In this case, even if a command cannot be processed, when a time for which a cache unit has been occupied reaches the preset quantity of cache unit recycling periods, the cache unit can be recycled with no need to wait until the system is reset, thereby effectively improving cache unit utilization.

The following specifically describes technical solutions of the present invention by means of embodiments.

FIG. 4 is a flowchart of a memory resource management method according to the present invention. As shown in FIG. 4, the method of this embodiment may include the following steps:

Step 101: Determine a recyclable cache unit according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied.

In the present invention, the first indication information and the second indication information may form a bitmap table. For ease of description, the first indication information is referred to as a USE field (indicating whether a corresponding cache unit is occupied), and the second indication information is referred to as an AGE field (indicating whether a corresponding cache unit needs to be aged). A cache unit recycling period may be configured according to an estimated time from a time when an existing command is sent to a time when a response is returned, and may be greater than a maximum estimated time. Other determining methods are also applicable, and are not limited in the present invention.

In actual use, whether there is a recyclable cache unit may be detected in real time, but processing performance of a whole system is lowered in this way. To effectively reduce consumption of system processing resources in a process of determining a recyclable cache unit, whether there is a recyclable cache unit may be monitored according to a period, and the period may be user-defined, or may be preset. In the present invention, the foregoing cache unit recycling period is used as an example for description.

When a cache unit recycling period is reached, cache units that are occupied are first determined according to USE fields. After cache units that are occupied are determined, whether AGE fields corresponding to the cache units indicate that the cache units have been occupied for n cache unit recycling periods is determined, where n is a positive integer greater than or equal to 1. If yes, it is determined that the cache units that are occupied and that have been occupied for n cache unit recycling periods are recyclable cache units, where n indicates a preset quantity of cache unit life periods, that is, if a cache unit has been occupied for n cache unit recycling periods, the cache unit is forcibly recycled.

It should be noted that, if it has been determined according to USE fields that the cache units are cache units that are occupied, but AGE fields corresponding to the cache units indicate that the cache units have been occupied for m cache unit recycling periods, rather than n cache unit recycling periods, where m is a positive integer less than or equal to n, values of AGE fields corresponding to the cache units that have been occupied for m cache unit recycling periods are changed into m+f, that is, the cache units have been occupied for m+f cache unit recycling periods, where f is a positive integer greater than or equal to 1 (if f is greater than 1, in combination with the cache unit recycling period, cache units may be forcibly recycled according to delay of processing on different commands, which is more flexible), and m+f is a positive integer less than or equal to n. That is, when each cache unit recycling period arrives, a preset value f is added to cache unit recycling periods for which a cache unit that is occupied has been occupied, so that when a subsequent cache unit recycling period arrives, a quantity of cache unit recycling periods for which the cache unit has been occupied inevitably reaches n, and the cache unit is forcibly recycled when n is reached.

For example, a preset quantity of cache unit life periods is 3 cache unit recycling periods, that is, if a cache unit has been occupied for 3 cache unit recycling periods, the cache unit is forcibly recycled. In this case, 2 bits are used to indicate an AGE field, and f is set to 1. When a value of the AGE field is 00, it indicates that 0 cache unit recycling periods have passed; when a value of the AGE field is 01, it indicates that 1 cache unit recycling period has passed; when a value of the AGE field is 10, it indicates that 2 cache unit recycling periods have passed; and when a value of the AGE field is 11, it indicates that 3 cache unit recycling periods have passed.

On the basis of the foregoing example, when 2 bits are used to indicate an AGE field, and f is 1, that is, when the second cache unit recycling period arrives, if a corresponding value of the AGE field is 10 (1 in decimalism), the corresponding value of the AGE field is changed into 11 (2+1 in decimalism).

The following uses that first indication info nation and second indication information are both 1 bit as an example for description, that is, a bitmap of 2 bits is used to manage cache units, and when a cache unit recycling period arrives, if a cache unit recycling period for which a cache unit has been occupied in an AGE field indicates that the cache unit has been occupied for 1 cache unit recycling period, the cache unit is recycled.

In the bitmap of 2 bits, 1 bit is a USE field, which is consistent with the existing bitmap solution. When 1 bit of the USE field is labeled as 0, it indicates that the cache unit is occupied, and when 1 bit of the USE field is labeled as 1, it indicates that the cache unit is not occupied. The other 1 bit is an AGE field, which is used to manage the corresponding USE field. A user may configure a cache unit recycling period corresponding to an AGE field according to an estimated time from a time when a request is sent to a time when a response is returned (where a configuration value of a cache unit recycling period is generally greater than a maximum estimated value). When 1 bit of the AGE field is labeled as 1 and 1 bit of the USE field is labeled as 1, it indicates that the cache unit is not occupied and 0 cache unit recycling periods have passed; when 1 bit of the AGE field is labeled as 1 and 1 bit of the USE field is labeled as 0, it indicates that the cache unit is occupied and 0 cache unit recycling periods have passed; when 1 bit of the AGE field is labeled as 0 and 1 bit of the USE field is labeled as 0, it indicates that 1 cache unit recycling period has passed for the cache unit; and when a next cache unit recycling period arrives, if the cache unit has not been normally recycled, the cache unit is forcibly recycled, and 1 bit of the AGE field is labeled as 1 and 1 bit of the USE field is labeled as 1.

For another example, a preset quantity of cache unit life periods is 6 cache unit recycling periods, that is, if a cache unit has been occupied for 6 cache unit recycling periods, the cache unit is forcibly recycled. In this case, an AGE field may use indication information of 3 bits, and f is set to 1. When a value of the AGE field is 000, it indicates that 0 cache unit recycling periods have passed; when a value of the AGE field is 100, it indicates that 1 cache unit recycling period has passed; when a value of the AGE field is 010, it indicates that 2 cache unit recycling periods have passed; when a value of the AGE field is 110, it indicates that 3 cache unit recycling periods have passed; when a value of the AGE field is 001, it indicates that 4 cache unit recycling periods have passed; when a value of the AGE field is 101, it indicates that 5 cache unit recycling periods have passed; and when a value of the AGE field is 011, it indicates that 6 cache unit recycling periods have passed.

Optionally, on the basis of the foregoing example, f may be further set to 2. When a value of the AGE field is 000, it indicates that 0 cache unit recycling periods have passed; when a value of the AGE field is 010, it indicates that 1 cache unit recycling period has passed; when a value of the AGE field is 001, it indicates that 2 cache unit recycling periods have passed; and when a value of the AGE field is 011, it indicates that 6 cache unit recycling periods have passed.

As can be seen from the foregoing two manners, if a quantity of cache unit life periods that is preset by a system is relatively large, and a relatively small f is used, the cache unit can be recycled only by means of execution for relatively many rounds. For example, in the foregoing example, when f is 1, 6 rounds are needed. If a relatively large f is used, the cache unit can be recycled by means of execution for relatively few rounds. For example, in the foregoing example, when f is 2, only 3 rounds are needed, thereby effectively improving cache unit utilization.

On the basis of the foregoing example, 3 bits are used to indicate an AGE field, and f is 2, that is, 3 bits are used to indicate first indication information and 1 bit is used to indicate second indication information. A bitmap of 4 bits is used to manage cache units, and when a cache unit recycling period arrives, if a cache unit recycling period for which a cache unit has been occupied in the AGE field indicates that the cache unit has been occupied for 6 cache unit recycling periods, the cache unit is recycled.

In the bitmap of 4 bits, 1 bit is a USE field, which is consistent with the existing bitmap solution. When 1 bit of the USE field is labeled as 0, it indicates that the cache unit is occupied; and when 1 bit of the USE field is labeled as 1, it indicates that the cache unit is not occupied. The other 3 bits are an AGE field, which is used to manage a corresponding USE field. When 3 bits of the AGE field are labeled as 000 and 1 bit of the USE field is labeled as 1, it indicates that the cache unit is not occupied and 0 cache unit recycling periods have passed; when 3 bits of the AGE field are labeled as 000 and 1 bit of the USE field is labeled as 0, it indicates that the cache unit is occupied and 0 cache unit recycling periods have passed; when 3 bits of the AGE field are labeled as 010 and 1 bit of the USE field is labeled as 0, it indicates that 2 cache unit recycling periods have passed for the cache unit; when 3 bits of the AGE field are labeled as 010 and 1 bit of the USE field is labeled as 0, it indicates that 2 cache unit recycling periods have passed for the cache unit; when 3 bits of the AGE field are labeled as 001 and 1 bit of the USE field is labeled as 0, it indicates that 4 cache unit recycling periods have passed for the cache unit; when 3 bits of the AGE field are labeled as 011 and 1 bit of the USE field is labeled as 0, it indicates that 6 cache unit recycling periods have passed for the cache unit; and when a next cache unit recycling period arrives, if the cache unit has not been normally recycled, the cache unit is forcibly recycled, and 3 bits of the AGE field are labeled as 000 and 1 bit of the USE field is labeled as 1.

It should be noted that, in the foregoing examples, values assigned to an AGE field are merely examples, and meanings represented by the values are also merely examples, which is not limited in the present invention. To express the thought of the present invention more clearly, in this embodiment, description is made based on the values assigned to an AGE field and the meanings of the values in the foregoing examples.

FIG. 5 is a schematic diagram of a cache unit recycling period. The cache unit recycling period is 1 ms, that is, whether there is a recyclable cache unit in cache units is detected once every 1 ms by using the method of the present invention.

Figure 6:
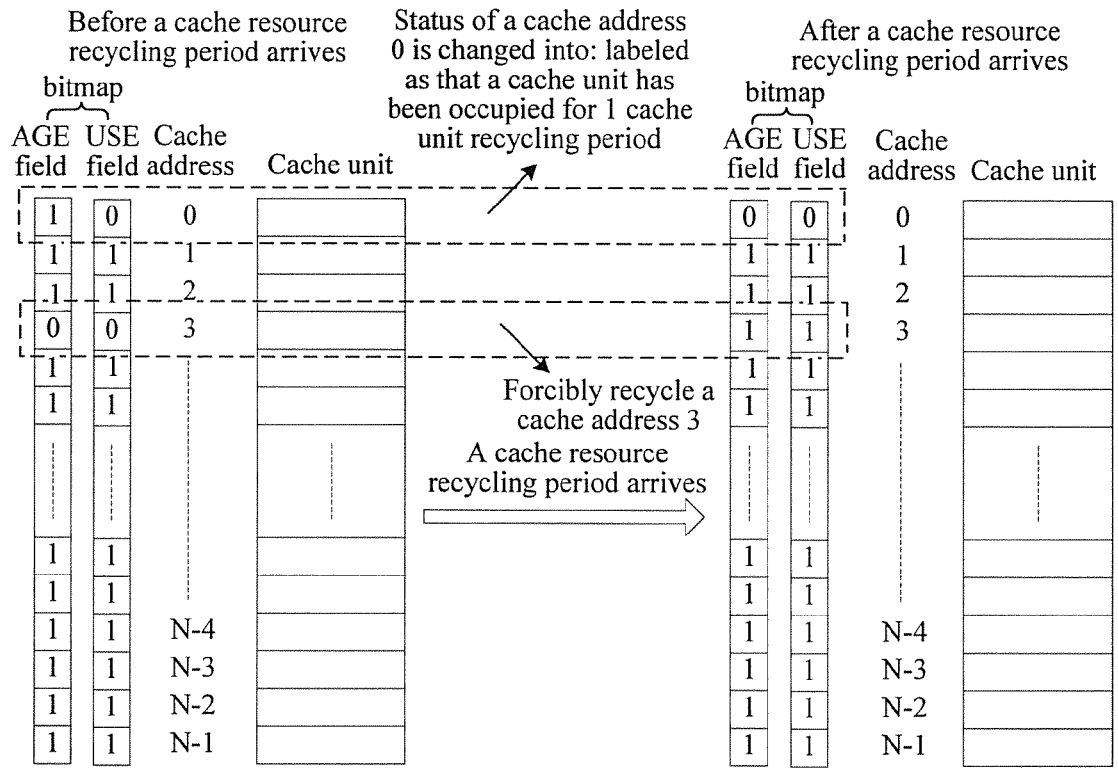
FIG. 6 is a schematic diagram of processing of a bitmap table when a cache unit recycling period arrives.

A process of determining a recyclable cache unit is that: FIG. 6 is a schematic diagram of processing of a bitmap table when a cache unit recycling period arrives, and as shown in FIG. 6, a cache address indicates an address of a cache unit; when a cache unit recycling period arrives (that is, when a value of a counter reaches a configured cache unit recycling period; and it should be noted that the counter performs cyclic counting and generates periodic cache unit recycling labels), assuming that when the first 1 ms arrives, all USE fields are scanned, and if a corresponding bit in a USE field that corresponds to a cache unit is labeled as 0 and a corresponding bit in an AGE field that corresponds to the cache unit is labeled as 1 (indicating that the cache unit is occupied and has been occupied for 0 cache unit recycling periods), then the corresponding bit in the AGE field that corresponds to the cache unit is labeled as 0 (indicating that the cache unit is occupied and has been occupied for 1 cache unit recycling period), so that when a next cache unit recycling period arrives, the cache unit can be recycled, for example, a cache unit whose cache address is 0 in FIG. 6; and if a bit in a USE field that corresponds to a cache unit is labeled as 0 and a corresponding bit in an AGE field that corresponds to the cache unit is labeled as 0 (indicating that the cache unit is occupied and has been occupied for 1 cache unit recycling period), then the cache unit is recycled and a cache address corresponding to the cache unit is recycled, and the bit in the USE field that corresponds to the cache unit is labeled as 1, and the bit in the AGE field that corresponds to the cache unit is labeled as 1 (indicating that the cache unit is not occupied), for example, a cache unit whose cache address is 3 in FIG. 6. In this example, if a cache unit that is occupied is always not being released, the cache unit is forcibly released in at most two cache unit recycling periods. An AGE field is labeled as 1 in the first cache unit recycling period, and if the cache unit has not been normally released when the second aging period arrives, the cache unit is forcibly released in the second cache unit recycling period.

Step 102: Recycle a recyclable cache unit.

Further, if an AGE field corresponding to a cache unit is labeled as 0 or 1, but a cache unit recycling instruction is received, where the cache unit recycling instruction carries an address corresponding to a to-be-recycled cache unit, then processing is performed according to a normal recycling procedure, that is, data in a cache unit corresponding to the address that corresponds to the to-be-recycled cache unit is read out, and a USE field and an AGE field that correspond to the cache unit corresponding to the recycling address are both labeled as 1.

Figure 7:
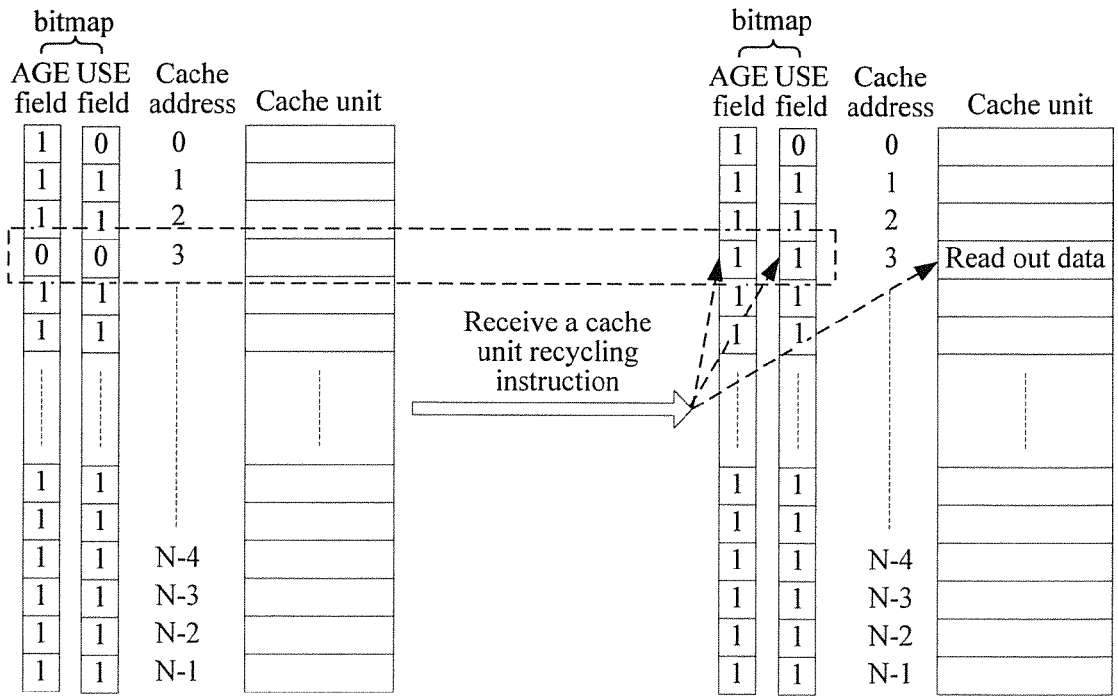
FIG. 7 is a schematic diagram of processing after a cache unit recycling instruction is received.

FIG. 7 is a schematic diagram of processing after a cache unit recycling instruction is received. As shown in FIG. 7, when a USE field and an AGE field that correspond to a cache unit whose cache address is 3 are both 0, and a next cache unit recycling period has not arrived, a cache unit recycling instruction is received, and a cache address that corresponds to a cache unit and that is carried in the cache unit recycling instruction is 3. Then, data stored in the cache unit whose cache address is 3 is read out, and the USE field and the AGE field that correspond to the cache unit whose cache address is 3 are both changed into 1, thereby releasing the cache unit whose cache address is 3, so that other commands continue to use the cache unit.

Figure 8:
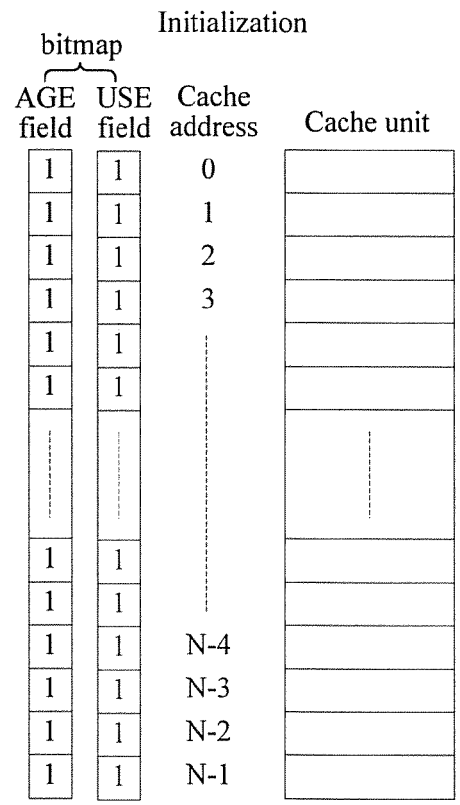
FIG. 8 is a schematic diagram of initialization.

Optionally, before a cache unit is used, a USE field and an AGE field that correspond to the cache unit further need to be initialized, that is, first indication information corresponding to each cache unit is labeled as that the cache unit is not occupied, and second indication information corresponding to each cache unit is labeled as that the cache unit has been occupied for 0 cache unit recycling periods. FIG. 8 is a schematic diagram of initialization. To initialize a USE field and an AGE field, it is only required that the USE field and the AGE field are both labeled as 1.

Figure 9:
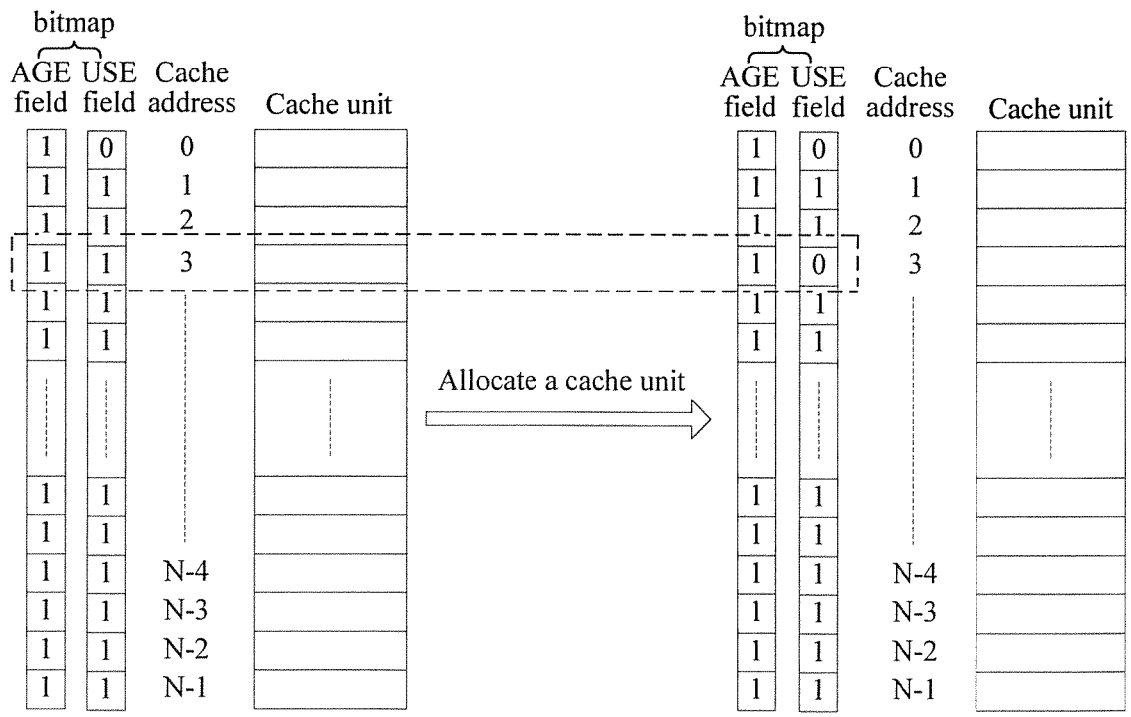
FIG. 9 is a schematic diagram of allocating a cache unit.

When a request for allocating a cache unit is received, it is only required that a label in a USE field that corresponds to the cache unit to be allocated is changed from 1 to 0. As shown in FIG. 9, if a system determines that a cache unit to be allocated is a cache unit corresponding to a cache address being 3, a label in a USE field that corresponds to the cache unit is changed from 1 to 0. A processing method after allocation is the same as that in the prior art, and details are not described herein again.

According to the memory resource management method provided in this embodiment, first, a recyclable cache unit is determined according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied; and then, the recyclable cache unit is recycled. A quantity of cache unit recycling periods is set, and when a time for which a cache unit has been occupied reaches the preset quantity of cache unit recycling periods, the cache unit is forcibly recycled, thereby effectively improving cache unit utilization and improving system bandwidth utilization.

Figure 10:
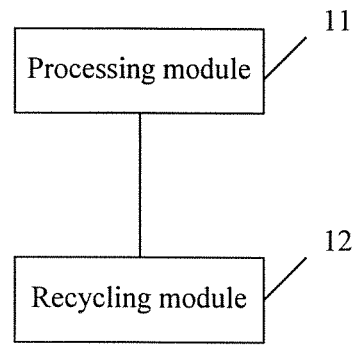
FIG. 10 is a first schematic structural diagram of a memory resource management apparatus according to an embodiment of the present invention.

FIG. 10 is a schematic structural diagram of a memory resource management apparatus according to an embodiment of the present invention. As shown in FIG. 10, the apparatus in this embodiment may include: a processing module 11 and a recycling module 12, where the processing module 11 is configured to determine a recyclable cache unit according to first indication information and second indication information that correspond to each cache unit, where the first indication information and the second indication information both include at least one bit, the first indication information indicates whether the cache unit is occupied, and the second indication information indicates a quantity of cache unit recycling periods for which the cache unit has been occupied; and the recycling module 12 is configured to recycle the recyclable cache unit.

Further, the processing module 11 is specifically configured to:

determine whether the first indication information corresponding to the cache unit indicates that the cache unit is occupied, and if the first indication information indicates that the cache unit is occupied, determine, according to the second indication information corresponding to the cache unit, whether the cache unit has been occupied for n cache unit recycling periods, where n is a positive integer greater than or equal to 1, and if yes, determine that the cache unit is the recyclable cache unit.

Further, the processing module 11 is further configured to determine whether the cache unit has been occupied for m cache unit recycling periods, where m is a positive integer less than or equal to n, and if yes, the processing module 11 is configured to change the second indication information corresponding to the cache unit into that the cache unit has been occupied for m+f cache unit recycling periods, where f is a positive integer greater than or equal to 1, and m+f is a positive integer less than or equal to n.

Further, the processing module 11 is further configured to change, after the recycling module 12 recycles the recyclable cache unit, the first indication information corresponding to the recyclable cache unit into that the recyclable cache unit is not occupied, and the second indication information corresponding to the recyclable cache unit into that the recyclable cache unit has been occupied for 0 cache unit recycling periods.

Figure 11:
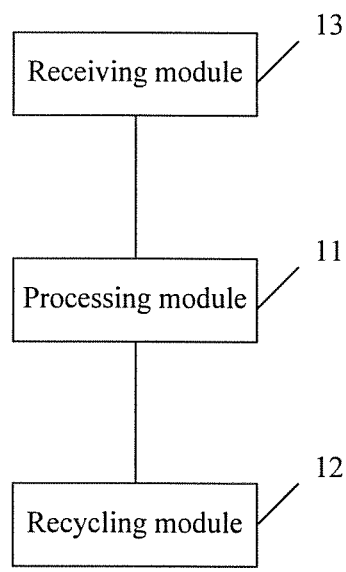
FIG. 11 is a second schematic structural diagram of a memory resource management apparatus according to an embodiment of the present invention.

Further, as shown in FIG. 11, the apparatus shown in FIG. 10 further includes: a receiving module 13, where the receiving module 13 is configured to receive, before the processing module 11 determines the recyclable cache unit according to the first indication information and the second indication information that correspond to each cache unit, a cache unit recycling instruction, where the cache unit recycling instruction carries an address corresponding to a to-be-recycled cache unit; and the processing module 11 is further configured to: recycle the to-be-recycled cache unit according to the address.

Further, the processing module 11 is further configured to label, before the receiving module 13 receives the cache unit recycling instruction, the first indication information corresponding to each cache unit as that the cache unit is not occupied, and the second indication information corresponding to each cache unit as that the cache unit has been occupied for 0 cache unit recycling periods.

The apparatus in this embodiment may be configured to perform the technical solution of the method embodiment shown in FIG. 4, whose implementation principles and technical effects are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A memory resource management method, comprising:
configuring, in a shared cache comprising multiple cache units, a bitmap table comprising multiple records, each record corresponding to one of the multiple cache units, each record comprising a first indication field and a second indication field that correspond to the corresponding cache unit, wherein the first indication field and the second indication field of each record both comprise at least one bit, the first indication field of the each record indicates whether the corresponding cache unit is occupied, and the second indication field of the each record indicates a quantity of cache unit recycling periods for which the corresponding cache unit has been occupied;

when a first cache unit of the multiple cache units has been occupied for m cache unit recycling periods, wherein m is a positive integer less than or equal to n, changing, in the bitmap table, the second indication field of the record corresponding to the first cache unit to a value indicating that the first cache unit has been occupied for m+f cache unit recycling periods, wherein f is a positive integer greater than or equal to 1, m+f is a positive integer less than or equal to n, and n indicates a preset quantity of cache unit recycling periods before recycling;

determining a recyclable cache unit according to the first indication field and the second indication field of the record that corresponds to each cache unit; and recycling the recyclable cache unit.

2. The method according to claim 1, wherein after recycling the recyclable cache unit, the method further comprises:
changing, in the bitmap table, the first indication field of the record corresponding to the recyclable cache unit to a value indicating that the recyclable cache unit is not occupied, and changing, in the bitmap table, the second indication field of the record corresponding to the recyclable cache unit to a value indicating that the recyclable cache unit has been occupied for 0 cache unit recycling periods.

3. The method according to claim 1, wherein before determining the recyclable cache unit according to the first indication field and the second indication field of the record that corresponds to each cache unit, the method further comprises:
receiving a cache unit recycling instruction, wherein the cache unit recycling instruction carries an address corresponding to a to-be-recycled cache unit; and
recycling the to-be-recycled cache unit according to the address.

4. The method according to claim 3, wherein before receiving a cache unit recycling instruction, the method further comprises:
labeling, in the bitmap table, the first indication field of the record corresponding to each cache unit to indicate that the cache unit is not occupied, and labeling, in the bitmap table, the second indication field of the record corresponding to each cache unit to indicate that the cache unit has been occupied for 0 cache unit recycling periods.

5. The method according to claim 1, wherein n=4, f=1, and the second indication field of each record comprises two bits.

6. The method according to claim 1, wherein n=6, f=2, and the second indication field of each record comprises three bits.

7. A memory resource management apparatus, comprising:
- a bitmap table comprising multiple records, each record corresponding to one of multiple cache units of a shared cache, each record comprising a first indication field and a second indication field that correspond to the corresponding cache unit, wherein the first indication field and the second indication field of each record both comprise at least one bit, the first indication field of the each record indicates whether the corresponding cache unit is occupied, and the second indication field of the each record indicates a quantity of cache unit recycling periods for which the corresponding cache unit has been occupied;
- a processing module, configured to:
  - when a first cache unit of the multiple cache units has been occupied for m cache unit recycling periods, wherein m is a positive integer less than or equal to n, change, in the bitmap table, the second indication field of the record corresponding to the first cache unit to a value indicating that the first cache unit has been occupied for m+f cache unit recycling periods, wherein f is a positive integer greater than or equal to 1, m+f is a positive integer less than or equal to n, and n indicates a preset quantity of cache unit recycling periods before recycling; and
  - determine from the bitmap table, a recyclable cache unit according to the first indication field and the second indication field of the record that corresponds to each cache unit; and
- a recycling module, configured to recycle the recyclable cache unit.

8. The apparatus according to claim 7, wherein the processing module is further configured to change, in the bitmap table, after the recycling module recycles the recyclable cache unit, the first indication field of the record corresponding to the recyclable cache unit to a value indicating that the recyclable cache unit is not occupied, and the second indication field of the record corresponding to the recyclable cache unit to a value indicating that the recyclable cache unit has been occupied for 0 cache unit recycling periods.

9. The apparatus according to claim 7, further comprising:
- a receiving module, configured to receive, before the processing module determines from the bitmap table the recyclable cache unit according to the first indication field and the second indication field of the record that corresponds to each cache unit, a cache unit recycling instruction, wherein the cache unit recycling instruction carries an address corresponding to a to-be-recycled cache unit;
- wherein the processing module is further configured to recycle the to-be-recycled cache unit according to the address.

10. The apparatus according to claim 9, wherein the processing module is further configured to label, in the bitmap table, before the receiving module receives the cache unit recycling instruction, the first indication field of the record corresponding to each cache unit to indicate that the cache unit is not occupied, and label the second indication field of the record corresponding to each cache unit to indicate that the cache unit has been occupied for 0 cache unit recycling periods.

* * * * *